(12) United States Patent
Barton et al.

(10) Patent No.: US 6,180,945 B1
(45) Date of Patent: Jan. 30, 2001

(54) DUAL SPIRAL PHOTOCONDUCTIVE DETECTOR

(75) Inventors: Don C. Barton, Newport Beach; Michael J. Gorbett, Huntington Beach, both of CA (US)

(73) Assignee: Lockheed Martin Corporation, Bethesda, MD (US)

( * ) Notice: Under 35 U.S.C. 154(b), the term of this patent shall be extended for 0 days.

(21) Appl. No.: 06/646,325

(22) Filed: Aug. 31, 1984

(51) Int. Cl.[7] ................ G01T 1/24; F41G 7/00; G01J 5/02; H01J 3/14
(52) U.S. Cl. ............ 250/370.1; 244/3.16; 250/203.1; 250/203.6; 250/342; 250/234
(58) Field of Search ............ 244/3.16; 250/211 R, 250/236, 338, 342, 203 R, 370.1

(56) References Cited

U.S. PATENT DOCUMENTS

| | | | |
|---|---|---|---|
| 2,668,184 | * 2/1954 | Taylor et al. | 250/211 R |
| 2,999,177 | 9/1961 | Null et al. | |
| 3,296,443 | * 1/1967 | Argyle | 244/3.16 |
| 3,426,198 | 2/1969 | Autrey | |
| 3,494,576 | * 2/1970 | Lamelot | 244/3.16 |
| 3,727,057 | 4/1973 | Higby et al. | |
| 3,745,360 | 7/1973 | Paul | |
| 3,995,159 | 11/1976 | Elliott | |
| 4,024,397 | 5/1977 | Weiner | |
| 4,027,160 | 5/1977 | Driffield et al. | |
| 4,040,744 | * 8/1977 | Schertz et al. | 250/342 |
| 4,244,540 | * 1/1981 | Vollmerhausen | 244/3.16 |
| 4,383,663 | * 5/1983 | Nichols | 244/3.16 |

* cited by examiner

Primary Examiner—Stephen C. Buczinski
(74) Attorney, Agent, or Firm—John J. Morrissey

(57) ABSTRACT

A photoconductive detector (3) comprises a single continuous photoconductive strip consisting of two interleaved photoconductive spiral paths (1, 2) separated by much thinner gaps (5, 6). The two spiral paths (1, 2) have the same central point (19). The detector (3) is substantially planar and has the overall shape of roughly a circle (10). A circular band (4) of incident radiation (16) crosses the gaps (5, 6) in a nearly parallel fashion, rather than nearly perpendicularly as in the prior art, lessening unwanted modulations of the detected signal. The terminal (11) to terminal (12) resistance of the detector (3) is increased to the point where, when the photodetector (3) is made of the preferred HgCdTe, simple thermo-electric coolers are sufficient to enable use of the detector (3) as an infrared detector (3) in a heat-seeking missile (17).

4 Claims, 2 Drawing Sheets

DUAL SPIRAL PHOTOCONDUCTIVE DETECTOR

TECHNICAL FIELD

This invention pertains to the field of radiation detectors in which the resistance therethrough changes in response to the amount of incident radiation impinging thereon.

BACKGROUND ART

U.S. Pat. No. 3,745,360 describes a radiation detector that, like the present invention, has a circle-shaped outer contour. However, the reference differs from the present invention in that: 1) four radiation-sensitive resistances are arranged in a bridge circuit, rather than a single continuous photoconductor being used; 2) the radiation-sensitive resistances do not have a dual interleaved spiral configuration; 3) the reference is a staring type of detector, rather than one which is circularly scanned; and 4) it would be hard to use this technique with the preferred HgCdTe of the present invention because HgCdTe has too low a resistance.

U.S. Pat. No. 3,995,159 discloses a rectangular HgCdTe photoconductive element that is designed to be part of a larger array. It does not have a dual spiral pattern. It is used with a linear raster scan, rather than with a circular scan.

U.S. Pat. No. 4,024,397 is an infrared thermistor bolometer detector that senses temperature differentials by means of changes in resistance. Current and voltage differentials are measured, as in the present invention. However, the one or two bolometer flakes 28, 29 are not configured in a dual spiral pattern.

U.S. Pat. No. 4,027,160 discloses an array of detectors of rectangular size, using various reticle patterns, including zig zag ones. It does not disclose a detector having a dual spiral pattern.

U.S. Pat. No. 2,999,177 discloses a lead sulfide vidicom, i.e., a mosaic array of many rectangular monolithic lead sulfide detectors. Information is stored in the array, then interrogated by an electron beam.

U.S. Pat. No. 3,426,198 discloses an array of square monolithic lead sulfide detectors.

U.S. Pat. No. 3,727,057 discloses an array of rectangular photoconductive detectors having oppositely poled adjacent elements.

DISCLOSURE OF INVENTION

The present invention is a substantially planar photoconductive detector (3) having an outer contour substantially in the shape of a circle (10) and comprising a single continuous photoconductive strip (1, 2). The strip comprises two interleaved photoconductive paths (1, 2) each in the shape of a spiral. The paths (1, 2) are connected together at a point (19) that defines the central point of each of the spirals.

Two gaps (5, 6) that are narrow compared with each of the photoconductive paths (1, 2) separate the paths (1, 2).

A preferred material for the photoconductor (3) is mercury cadmium telluride (HgCdTe). This material has a low resistivity, and therefore the dual spiral configuration advantageously increases the resistance for a given area of photoconductor (3) by means of lengthening the paths (1, 2). When used as an infrared detector (3) on board a missile (17), the detector (3) is preferably used with a circular scan projector (14) which, e.g., converts a remote point target (13) into a circle (4) on the surface of the detector (3).

Advantages of the present detector (3) over the prior art include:

1. Since the detector (3) active area is substantially circular (10), there is better matching to the circular optics (14) used in many missiles (17). Compared with a square or rectangular detector (8), unused corners (23), which only add to the noise without contributing to the detecting capability, are avoided.
2. The photoconductive paths (1, 2) contain no sharp bends. Bends contribute to higher noise, decreasing the figure of merit D* of a detector, because they create differential current densities, producing changes in noise and in sensitivity.
3. The gaps (5, 6) between the paths (1, 2) are well suited to a rotating scanning optical system (14), thereby increasing the performance of the detector (3), because as the target (13) is replicated as a scanning circular band (4) across the surface of the detector (3), the gaps (5, 6) are nearly parallel to the scan direction of the circular band (4). If the band (4 were to encounter perpendicular or nearly perpendicular gaps (5, 6), unwanted modulations would be much more severe.
4. The paths (1, 2) have substantially uniform width, further avoiding unwanted modulations of the detected signals.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
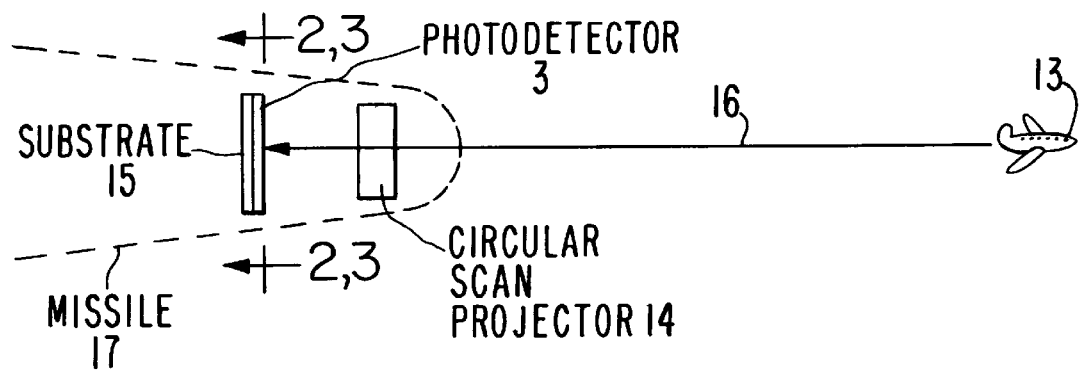
FIG. 1 is a side view sketch of an environment in which a photoconductive detector such as that (3) of the present invention can operate.

FIG. 1 shows photodetector 3 disposed to accept radiation 16 emanating from a remote target 13. Photodetector 3 is mounted on a substrate 15 within the nose of a missile 17. Substrate 15 may be sapphire and photodetector 3 may be epoxied thereto. In the path of the radiation 16 is a circular scan projector 14, e.g., a gimbal-mounted rotating optics system, which converts a point target 13 into a circular image 4 on the surface of photodetector 3. A defocussed spot target 13 is converted by circular scan projector 14 into a circular band 4 on the surface of the detector 3. The optics system 14 may contain a reticle to "chop" the radiation 16. If the radiation 16 is chopped by a reticle, the circular band 4 is not continuous but is a series of chopped circular arcuate bands.

Detector 3 is a photoconductive detector. As used in the present specification and claims, a photoconductive detector is one whose resistance changes relative to the amount of incident radiation 16 impinging thereon. A constant bias current is passed through the terminals 11, 12 of the detector 3 (see FIG. 3). Thus, the changing resistance through detector 3 produces a changing voltage, which is detected at terminals 11, 12 and amplified. A time of occurrence of a given voltage change is correlated with the rotation rate of the circular scan projector 14. A photoconductive detector is to be contrasted with a photovoltaic detector, in which the resistance of the detector does not change, but rather the current produced by the detector changes.

Photodetector 3 is typically made of a material that is sensitive to infrared radiation 16, such as lead selenide or lead sulfide. Thus, detector 3 is able to sense the heat emanating from target 13. This is the type of detector 3 used in the well known series of missiles 17 denominated "Sidewinder". A particularly good detector of infrared radiation 16 is mercury cadmium telluride (HgCdTe). However, HgCdTe has a very low resistance (measured between terminals 11, 12). Increasing the resistance of detector 3 is desirable so that the bias current applied between the terminals 11, 12 may be lowered, resulting in lower $I^2R$ losses. Lowering the $I^2R$ losses enables simpler cooling for the detector 3. HgCdTe in particular must be cooled to a very low temperature in order to function as an acceptable infrared detector. With the use of the present invention, a simple cooling system, such as a thermo-electric cooler entailing running current backwards through an array of diodes, rather than a complicated cooling system such as a Joule-Thompson high pressure cryogenic air cooler, can be used to cool detector 3.

Figure 2:
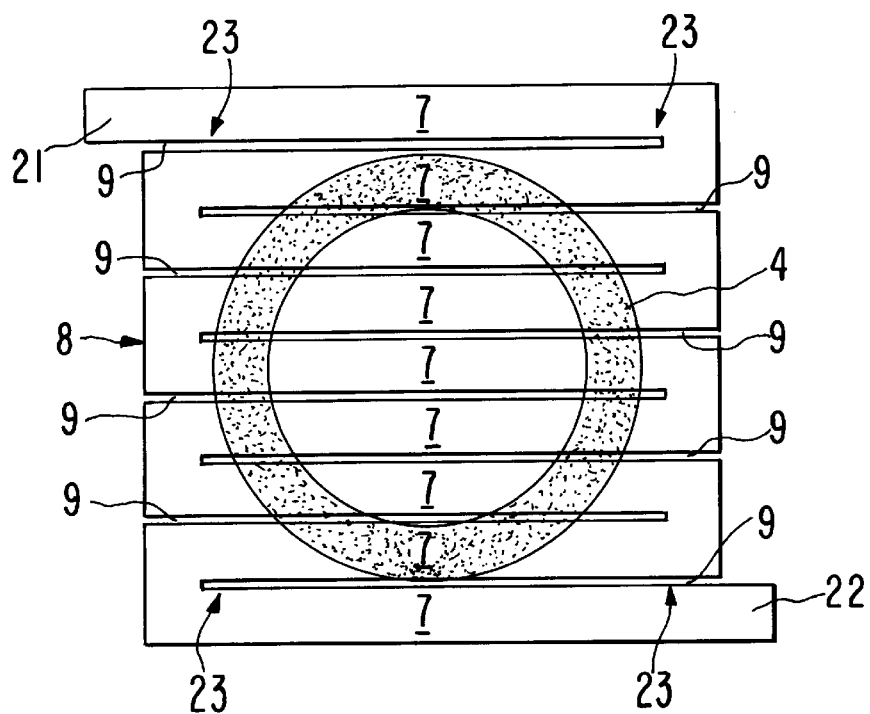
FIG. 2 is a plan view of a prior art detector (8)

A common prior art method for increasing the resistance of a photoconductive detector 8 is illustrated in FIG. 2. It can be seen that the outer shape of the prior art photoconductor 8 follows a square pattern. Detector 8 comprises a labyrinth of interconnected elongated photoconductive strips 7, separated by narrow rectangular gaps 9, and terminating at terminals 21 and 22. The theory behind the labyrinth layout of the prior art detector 8 was to increase the path length of the photoconductive material, thus increasing the inter-terminal resistance, which is proportional to the path length.

At certain points along circular image band 4, gaps 9 are nearly perpendicular to the scan direction of band 4, resulting in unwanted modulations of the detected signal measured between terminals 21 and 22. Another problem with this prior art detector 8 is that unused and therefore wasted corners 23 are present. A third problem is that sharp bends in the photoconductive paths 7 are present, adding to the noise and decreasing the D* of the detector 8. Detector 3 of the present invention remedies these problems.

Figure 3:
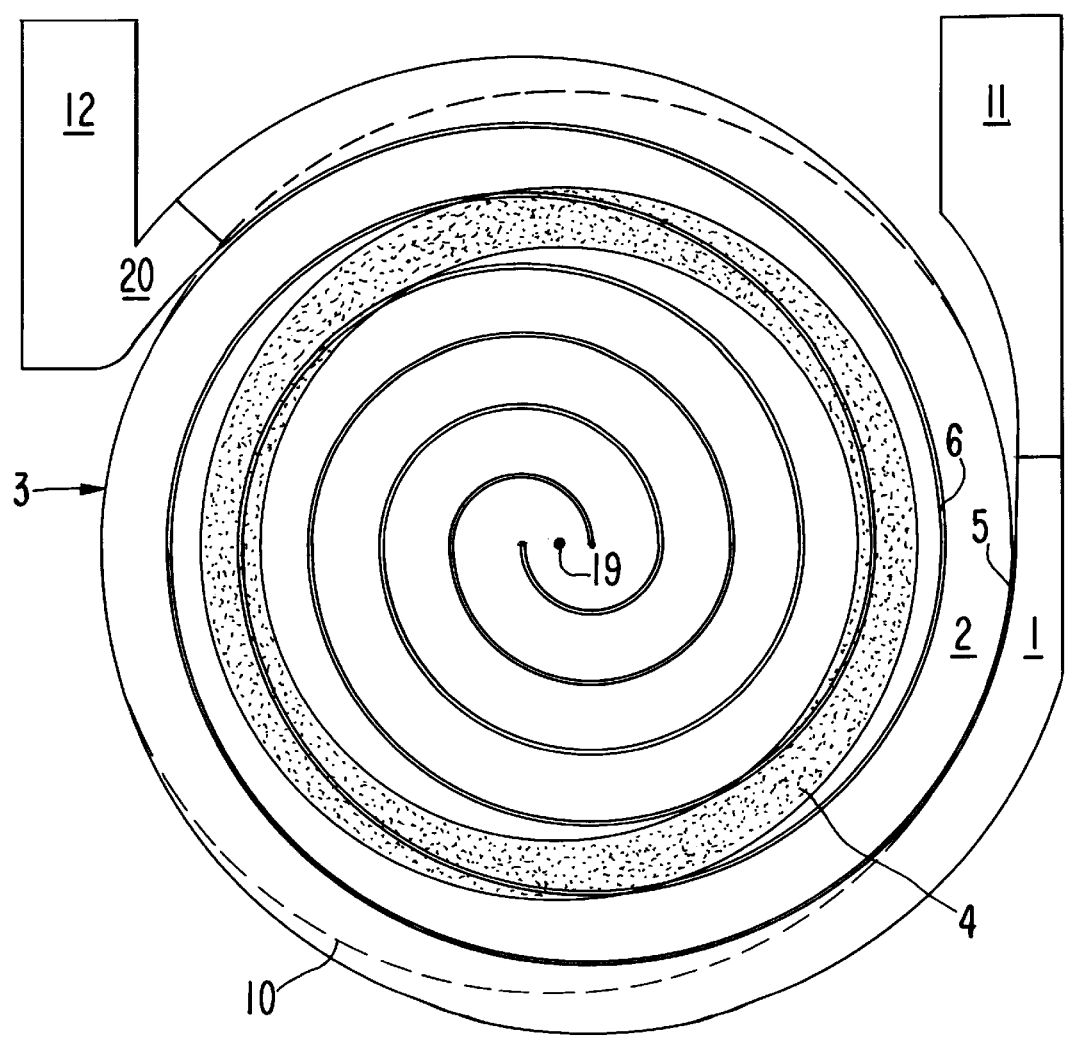
FIG. 3 is a plan view of a typical embodiment of the photoconductive detector (3) of the present invention.

A typical embodiment of detector 3 is illustrated in FIG. 3. It can be seen that the overall shape of detector 3 is roughly a circle 10, thus making detector 3 better matched to the circular optics 14 prevalent in today's missiles 17.

Detector 3 comprises a single continuous photoconductive strip consisting of two substantially planar photoconductive paths 1, 2, each having the shape of a spiral. As used throughout this specification and claims, "spiral" is taken in the common ordinary definition of the term. For example, *Webster's New Collegiate Dictionary* (copyright 1977 by G. & C. Merriam Co.) defines "spiral" as "the path of a point in a plane moving around a central point while continuously receding from or approaching it". In a spiral, the pitch is substantially constant at all points along the spiral. "Pitch" is the angle formed between the spiral path (1 or 2) at any point therealong and a circle tangent to said path (1 or 2) at that point, said circle having its center at the central point 19 of the spiral path (1 or 2). In detector 3, the two spirals 1, 2 have the same central point 19. This is the point 19 at which the two paths 1, 2 connect. The connection is a smooth one.

The two spiral paths 1, 2 are interleaved and have the same direction; i.e., as one leaves central point 19 along either path 1 or 2, one travels in a counter-clockwise direction. Alternatively, the spiral paths 1, 2 could be clockwise.

The paths 1, 2 are separated by narrow gaps 5, 6, where the incident radiation 16 encounters the substrate 15 but no photoconductive material. The gaps 5, 6 should be made as narrow as possible so that detector 3 loses as little information as possible from the incident radiation 16. Ion beam milling is a suitable technique for making very narrow gaps 5, 6.

The spiral paths 1, 2 terminate in bonding pads, 11 and 12, respectively, which provide means to make electrical connections to the paths 1, 2. Pads 11, 12 are opaque to the incident radiation 16 and are typically fabricated of indium subsequent to the formation of the paths 1, 2 onto the substrate 15. Pad 12 contains a sharp bend 20 to facilitate the making of an electrical connection thereto. Photoconductive material (continuations of paths 1, 2) is present beneath the pads 11, 12 (i.e., it is situated between the substrate 15 and the pads 11, 12) and has the same shape as the pads 11, 12, including bend 20, but since pad 12 shields this region of photoconductive material from radiation 16, bend 20 is of no consequence. No such bends occur within the circle 10 defining the active area of detector 3.

Decreasing the thickness of detector 3 (thickness is measured in the plane of the page in which FIG. 3 is drawn) advantageously increases its terminal (11) to terminal (12) resistance. But if photodetector 3 is too thin, there will not be enough photoconductive material to adequately respond to the incident radiation 16. If detector 3 is too thick, a change in resistance creating free carriers is shunted by the photodetector 3 in its region near substrate 15. A thickness of between 5 microns and 10 microns is optimum for HgCdTe.

Decreasing the widths of the paths 1, 2 (these widths are measured in the plane of the page in which FIG. 3 is drawn) advantageously increases the detector 3 resistance. However, this results in the circular band 4 crossing a greater number of gaps 5, 6, creating unwanted modulations of the detected signal. In the case of HgCdTe, a suitable compromise is that the widths of the paths 1, 2 should be approximately 3.5 mils. It is desirable for the two paths 1, 2 to have the same substantially constant width at all points therealong, to avoid unwanted modulations.

In an example of a photoconductor 3 that has been fabricated from HgCdTe according to the teachings of the present invention, the diameter of circle 10 defining the active area of the detector 3 was 52 mils. The gaps 5, 6 were formed by ion beam milling and were 0.2 mil wide. The paths 1, 2 were about 3.5 mils wide and about 7 microns thick. The spiral shapes for the paths 1, 2 were generated by a computer which was instructed to keep constant the pitch of each of the paths 1, 2; eight times per 360° revolution, the computer recalculated the circles tangent to each path 1, 2. The resulting resistance measured between terminals 11 and 12 was approximately 75,000 ohms.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A photoconductive detector having a substantially planar, roughly circular overall shape, said detector comprising:

one single continuous photoconductive strip fabricated of HgCdTe that is responsive to radiation in the infrared region of the electromagnetic spectrum, said strip consisting of two interleaved photoconductive portions each having the shape of a spiral, said portions blending into each other at a central point of each of said spirals;

wherein said detector is mounted on a substantially planar dielectric substrate.

2. The detector of claim 1 wherein each photoconductive spiral portion has the same substantially constant width; and the spiral portions are separated by two gaps having the same substantially constant width, said gap width being small compared with the width of the paths.

3. The detector of claim 2 wherein the photoconductive spiral portions are between five and ten microns thick, and are approximately 3.5 mils wide; and the gaps are approximately 0.2 mil wide.

4. The detector of claim 1 further comprising, in combination, means for projecting an image of a target onto a surface of the detector; wherein the detector and the projecting means are mounted on board a missile; and the projecting means converts the target into an image scanned in a circular orbit around an optical axis of the detector.

* * * * *